(12) United States Patent
Lee et al.

(10) Patent No.: US 7,769,399 B2
(45) Date of Patent: Aug. 3, 2010

(54) APPARATUS AND METHOD FOR MANAGING CONNECTION IDENTIFIERS IN MULTI-HOP RELAY BROADBAND WIRELESS ACCESS SYSTEM

(75) Inventors: Sung-Jin Lee, Seoul (KR); Pan-Yuh Joo, Seoul (KR); Jung-Je Son, Seongnam-si (KR); Jae-Weon Cho, Suwon-si (KR); Hyoung-Kyu Lim, Seoul (KR); Yeong-Moon Son, Anyang-si (KR); Mi-Hyun Lee, Seoul (KR); Hyun-Jeong Kang, Seoul (KR); Song-Nam Hong, Seoul (KR); Jae-Gwa Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 521 days.

(21) Appl. No.: 11/546,045

(22) Filed: Oct. 11, 2006

(65) Prior Publication Data

US 2007/0082621 A1    Apr. 12, 2007

(30) Foreign Application Priority Data

Oct. 11, 2005    (KR) ............ 10-2005-0095453

(51) Int. Cl.
*H04W 4/00*    (2009.01)
*H04B 7/15*    (2006.01)
*H04B 7/185*    (2006.01)

(52) U.S. Cl. ............ 455/466; 455/11.1; 455/13.1
(58) Field of Classification Search .......... 455/69, 455/435.1, 13.1, 11.1
See application file for complete search history.

(56) References Cited

U.S. PATENT DOCUMENTS

| 2005/0047364 | A1* | 3/2005 | Matsukura et al. ....... 370/328 |
| 2005/0232183 | A1* | 10/2005 | Sartori et al. ........ 370/319 |
| 2005/0265360 | A1* | 12/2005 | Kim et al. ........... 370/400 |
| 2005/0272481 | A1* | 12/2005 | Kim ............... 455/574 |

FOREIGN PATENT DOCUMENTS

| JP | 2001-186573 | 7/2001 |
| JP | 2003-348130 | 12/2003 |
| KR | 1020070030622 | 3/2007 |
| KR | 1020070038657 | 4/2007 |
| WO | WO 2005/025091 | 3/2005 |

OTHER PUBLICATIONS

Yu-Ching Hsu et al., Mobility Management for Mobile Multi-Hop Relay Networks, IEEE 802.16 Session #39, 2005.
Mike Hart et al., Factors That Affect Performance of a Mobile Multihop Relay System, IEEE 802.16 Session #39, 2005.
Carl Eklund et al., IEEE Standard 802.16: A Technical Overview of the WirelessMAN Air Interface for Broadband Wireless Access, IEEE Communications Magazine, 2002.
Kevin Baum et al., Transparent Uplink Relaying for OFDMA, IEEE 802.16 Broadband Wireless Access Working Group, 2004.

* cited by examiner

*Primary Examiner*—George Eng
*Assistant Examiner*—Chayce Bibbee
(74) *Attorney, Agent, or Firm*—The Farrell Law Firm, LLP

(57) ABSTRACT

A communication apparatus and method for an upper node in a communication system. The communication method includes assigning a Connection IDentifier (CID) set to a Relay Station (RS), generating a CID assignment message including information on the assigned CID set, and transmitting the CID assignment message to the RS.

28 Claims, 7 Drawing Sheets

APPARATUS AND METHOD FOR MANAGING CONNECTION IDENTIFIERS IN MULTI-HOP RELAY BROADBAND WIRELESS ACCESS SYSTEM

PRIORITY

This application claims priority under 35 U.S.C. §119 to an application filed in the Korean Intellectual Property Office on Oct. 11, 2005 and allocated Serial No. 2005-95453, the contents of which are incorporated herein by reference.

BACKGROUND OF THE INVENTION

1. Field of the Invention

The present invention relates generally to a multi-hop relay cellular system, and more particularly, to an apparatus and method for managing connection identifiers (CIDs) in a multi-hop relay based Broadband Wireless Access (BWA) system.

2. Description of the Related Art

Extensive research is being conducted to provide various Quality of Service (QoS) features with a data rate of about 100 Mbps in the advanced fourth-generation (4G) communication system. The 4G communication system is evolving to provide mobility, high data rate transmission, and high QoS in a BWA system such as a Local Area Network (LAN) system and a Metropolitan Area Network (MAN) system. Typical examples of the above system are based on the Institute of Electrical and Electronics Engineers (IEEE) 802.16d and IEEE 802.16e.

The IEEE 802.16d based system and the BWA system use an Orthogonal Frequency Division Multiplexing (OFDM)/Orthogonal Frequency Division Multiple Access (OFDMA) scheme. The IEEE 802.16d system considers only a fixed Subscriber Station (SS) and a single cell structure (i.e., the mobility of an SS is not considered). On the other hand, the IEEE 802.16e based system considers the mobility of an SS. When the mobility of an SS is considered, the SS will be referred to as a mobile station (MS).

FIG. 1 is a block diagram of a conventional BWA system.

Referring to FIG. 1, the BWA system has a multi-cell structure. The BWA system includes a cell 100, a cell 150, a base station (BS) 110 managing the cell 100, a BS 140 managing the cell 150, and a plurality of MSs 111, 113, 130, 151 and 153. The signal exchange between the BSs 110 and 140 and the MSs 111, 113, 130, 151 and 153 is performed using an OFDM/OFDMA scheme. The MS 130 is located in a boundary region (i.e., a handover region) between the cells 100 and 150. When the MS 130 moves from the cell 100 of the BS 110 into the cell 150 of the BS 140 while communicating with the BS 110, the serving BS of the MS 130 is changed from the BS 110 to the BS 140.

In such a BWA system (IEEE 802.16 system), an Uplink (UL) random access channel is used as a ranging channel. Initial ranging, periodic ranging, and bandwidth request ranging are performed using the ranging channel. When an MS enters a network (network entry procedure) or loses its system (network) information, the MS performs initial ranging to obtain UL synchronization. In an initial ranging operation, a BS determines the exact time of arrival of a ranging signal from an MS, calculates a round trip delay between the BS and MS, and informs the MS of a timing offset corresponding to the round trip delay. Further, in the initial ranging operation, the BS allocates the MS a primary management CID and a basic CID that are required for MS to enter the network and receive a control message.

FIG. 2 is a diagram for explaining an initial ranging process in a conventional BWA system.

Referring to FIG. 2, when powered on, an MS 201 receives a Downlink (DL) preamble from a serving BS 203 for synchronization with the BS 203. In step 204 the MS 201 receives a DL-MAP message and a Downlink Channel Descriptor (DCD) message from the BS 203 and acquires information about a DL channel from the received messages. Next, the MS 201 receives an UL-MAP message and an Uplink Channel Descriptor (UCD) message from the BS 203 and acquires information about an initial ranging opportunity period, an UL channel, and initial ranging parameters.

In this way, the MS 201 acquires minimal information about the UL and DL channels, and then the MS 201 performs a basic access procedure using the acquired information to communicate with the BS 203. This basic access procedure is called an initial ranging procedure.

In detail, the MS 201 sends a ranging request (RNG-REQ) message to the BS 203 in step 205. In response to the RNG-REQ message, the BS 203 sends a ranging response (RNG-RSP) message to the MS 201 in step 207. In this way, an initial ranging procedure is performed.

Since the initial ranging procedure is performed before the MS 201 registers with the BS 203, both the MS 201 and the BS 203 do not have information about their connection. The MS 201 uses an initial ranging CID as a CID. The initial ranging CID has a predetermined value (e.g., 0x000). Since the initial ranging CID is commonly used for all MSs, the initial ranging CID is not individually handled.

In a BWA system, a plurality of different CIDs other than the initial ranging CID is used as shown in Table 1 below.

TABLE 1

| CID | Value |
| --- | --- |
| Initial Ranging CID | 0x0000 |
| Basic CID | 0x0001~m |
| Primary management CID | m + 1~2m |
| Transport CID | 2m + 1~FE9F |
| Multicast CID | 0xFEA0~0x FEFE |

Referring to Table 1, an initial ranging CID is used in an initial ranging procedure where an MS initially tries to access a BS as described above.

A Basic CID is a unique CID assigned to an MS by a BS. The basic CID can be used in place of a Media Access Control (MAC) address of the MS while the MS and the BS are connected. After an initial ranging procedure, the MS and the BS transmit and receive a control message using the basic CID.

A primary management CID is used mainly in a network entry process. The network entry process starts with an initial ranging procedure and includes a sequence of procedures, such as MS registration, service negotiation, and IP address allocation. The network entry process is a process required for an MS to register with a BS. In the network entry process, the primary management CID is mainly used for the BS to identify the MS. Further, the primary management CID is used for the BS and MS to transmit and receive an important control message. The primary CID is assigned to the MS by the BS and maintained while the BS and the MS are connected like in the case of the basic CID.

A transport CID is used for transmitting service data. When an MS requests a BS for a service after a network entry process, the BS assigns the MS a transport CID so as to transmit data corresponding to the requested service. Until the requested service is completely provided, the assigned transport CID is maintained to identify a connection established for the service. Each time the MS requests a service, the BS assigns the MS a transport CID. Therefore, when the MS simultaneously requests a plurality of services such as a voice call, an image service, and an Internet service, the MS can be assigned a plurality of transport CIDs. Unlike the transport CID, the primary management CID and the basic CID are assigned to an MS only once.

A multicast CID is used when the same data is simultaneously transmitted to a plurality of MSs. When a BS intends to transmit data using the multicast CID, the BS simultaneously assigns a multicast CID to a plurality of MSs and transmits the same data to the plurality of MSs. Then, each of the MSs determines that the data is destined for itself and receives the data.

Messages used for an initial ranging procedure will now be described.

Table 2 below shows syntax of an RNG-REQ message transmitted from an MS to a BS.

TABLE 2

| Syntax | Size | Note |
|---|---|---|
| RNG-REQ_Message_Format( ) { | | |
|    Management Message Type = 4 | 8 bits | |
|    Downlink Channel ID | | |
|    TLV encoded Information { | variable | TLV specific |
|       SS MAC Address | | |
|       Requested Downlink Burst Profile | | |
|       MAC Version | | |
|       Ranging Anomalies | | |
|       AAS broadcast capability | | |
|    } | | |
| } | | |

Referring to Table 2, the RNG-REQ message includes a plurality of information entries. "Management Message Type" is equal to 4 and indicates the identity of the RNG-REQ message. "Downlink Channel ID" indicates a DL channel through which an UCD message including UL channel information is received. A TLV(Type/Lengthlvalue) encoded information field indicates encoded information including an SS Medium Access Control (MAC) Address, a Requested Downlink Burst Profile, an MAC Version, Ranging Anomalies and AAS(Adaptive Antenna System) Broadcast Capability. "SS MAC Address" is a MAC layer address of the MS and is used as an identifier of the MS. "Requested Downlink Burst Profile" is divided into a 0-3 bit section and a 4-7 bit section. In the 0-3 bit section, a Downlink Interval usage code (DIUC) is recorded for requesting formats required to receive and transmit physical channel signals (e.g., a modulation format and a error correcting format). The 4-7 bit section is a section for recording least significant bits (LSBs, 4 bits) of a Configuration Change Court field of the UCD message used for requesting ranging. The BS transmits a predetermined physical channel signal to the MS with reference to the information stored in the 0-3 bit section. "MAC version" indicates the version of a MC layer used by the MS. "Ranging Anomalies" includes information about whether the MS tries to access the BS at a maximum transmission (TX) power or a minimum TX power. When the BS instructs the MS to increase or decrease TX power to compensate for the TX power, time information, etc., the MS can use the Ranging Anomalies in response to the instruction of the BS. "AAS broadcast capability" indicates whether the MS is capable of receiving a broadcast message.

Table 3 below shows syntax of an RNG-RSP message transmitted from a BS to an MS.

TABLE 3

| Syntax | Size | Note |
|---|---|---|
| RNG-RSP_Message_Format( ) { | | |
|    Management Message Type = 5 | 8 bits | |
|    Uplink Channel ID | | |
|    TLV encoded Information { | variable | TLV specific |
|       SS MAC Address | 6 | |
|       Downlink Operational Burst Profile | 2 | |
|       Primary Management CID | 2 | |
|       Basic CID | 2 | |
|       Ranging Status | 4 | 1 = continue<br>2 = abort<br>3 = success<br>4 = rerange |
|       Timing adjust | 4 | |
|       Power level adjust | 1 | |
|       Downlink frequency override | 4 | Center Frequency (kHz) allowing an SS to perform an initial Ranging Request again |
|    } | | |
| } | | |

Referring to Table 3, the RNG-RSP message includes various information. "Management Message Type field" has a value of '5' to indicate that the present message is a Ranging Response message. "SS MAC Address field" contains a MAC layer address of the MS that will receive the RNG-RSP message. "Downlink Operational Burst Profile" is used as a response to the Requested Downlink Burst Profile of the RNG-REQ message from the MS and indicates a DIUC number that will be used by the BS. "Uplink Channel ID" indicates a UL channel for the MS. "Primary Management CID and a Basic CID are CIDs that are assigned to the MS by the BS in order to manage the connection between the BS and the MS while the MS receives a-service from the BS after a ranging procedure. "Ranging Status" indicates a response of the BS to a ranging request of the MS. When the Ranging Status has a value of '1', it indicates the need to continue the ranging process. When the Ranging Status field has a value of '2', it indicates the need to abort (stop) the ranging process. When the Ranging Status field has a value of '3', it indicates the success of the ranging process. When the Ranging Status field has a value of '4', it indicates the need to perform the ranging request again. "Timing Adjust" contains information that enables the MS to correct incorrect time information. "Power Level Adjust" contains information that enables the MS to adjust its TX/receiving (RX) power. "Downlink Frequency Override" is used to inform the MS of a frequency value of another channel, so that the MS can again perform an initial ranging request with another frequency when the Ranging Status is set to '2' for indicating the need to abort the ranging process.

As shown in Table 3, in an initial ranging process, an MS is assigned a Primary Management CID and a Basic CID.

In an IEEE 802.16e system such as the conventional BWA system illustrated in FIG. 1, a fixed BS communicates directly with an MS and thus a reliable wireless communication link can be easily established between the BS and the MS. Since the BS is fixed in the IEEE 802.16e system, it is disadvantageous to construct a flexible wireless communication network. Communication services are not efficiently provided when traffic and call requests change.

To address this problem, a multi-hop relay scheme is used in the IEEE 802.16e system such as a cellular wireless communication system. In the multi-hop relay scheme, data is relayed from an origin to a destination through a fixed relay station (RS), a mobile RS, or an MS. A multi-hop relay wireless communication system can immediately reconstruct a network in response to a change in a communication environment and can use wireless network resources more efficiently. For example, a cell service coverage and a system capacity can be increased in the multi-hop relay wireless communication system. When channel conditions are not good between a BS and an MS, an RS can be disposed between the BS and the MS to establish a multi-hop relay path, thereby providing better wireless channels to the MS. Further, the multi-hop relay scheme can be used in a boundary region between cells where channel conditions are poor in order to provide high data rate channels and expand a cell service coverage area.

FIG. 3 is a diagram illustrating a BWA system using a multi-hop relay scheme to expand a BS service coverage area.

Referring to FIG. 3, the multi-hop relay BWA system has a multi-cell structure. The multi-hop relay BWA system includes a cell 300, a cell 340, a BS 310 managing the cell 300, a BS 350 managing the cell 340, a plurality of MSs 311 and 313 located within the cell 300, a plurality of MSs 321 and 323 located in a region 330 outside the cell 300 of the BS 310 and communicating with the BS 310, an RS 320 providing a multi-hop relay path between the BS 310 and the MSs 321 and 323 located in the region 330, a plurality of MSs 351, 353 and 355 located in the cell 340, a plurality of MSs 361 and 363 located in a region 370 outside the cell 340 of the BS 350 and communicating with the BS 350, and an RS 360 providing a multi-hop relay path between the BS 350 and the MSs 361 and 363 located in the region 370. An OFDM/OFDMA scheme is used for communication among the BS 310 and 350, the RS 320 and 360, and the MSs 311, 313, 321, 323, 351, 353, 355, 361, and 363.

Although the MSs 311 and 313 located in the cell 300 and the RS 320 can directly communicate with the BS 310, the MSs 321 and 323 located in the region 330 cannot directly communicate with the BS 310. Therefore, the RS 320 covers the region 330 to relay signals between the BS 310 and the MSs 321 and 323. That is, the MSs 321 and 323 can communicate with the BS 310 through the RS 320. Further, the RS 360 and the MSs 351, 353, and 355 located in the cell 340 can directly communicate with the BS 350, the MSs 361 and 363 located in the region 370 cannot directly communicate with the BS 350. Therefore, the RS 360 covers the region 370 to relay signals between the BS 350 and the MSs 361 and 363. That is, the MSs 361 and 363 can communicate with the BS 350 through the RS 360.

Since the RSs 320 and 360 are additionally used in the multi-hop relay BWA system shown in FIG. 3, the conventional initial ranging process shown in FIG. 2 cannot be used. For example, an RNG-REQ message of an MS located outside a cell coverage area may be delivered to a BS through an RS, and an RNG-RSP message of the BS may be delivered to the MS through the RS.

Fields of the RNG-REQ and RNG-RSP messages (refer to Tables 2 and 3) other than the Basic CID field and the Primary Management CID field cannot be processed by a BS communicating with an MS using a multi-hop relay scheme. For example, fields of the messages related to power adjustment and burst profiles used for transmitting and receiving physical channel signals are the most representative fields that cannot be processed by the BS. Since such fields should provide information about actual physical channels between an MS and an RS, the BS indirectly connected with the MS cannot process such fields.

For this reason, it can be proposed that an RS processes some fields of an RNG-REQ message of an MS that are related to the RS and then transmits only the remaining fields of the RNG-REQ message to a BS. For example, an RS can transmit only the SS MAC address of an RNG-REQ message of an MS to a BS and receives an assigned CID from the BS. Then, the RS can construct an RNG-RSP message using the CID received from the BS and information processed by the RS in order to send the RNG-RSP message to the MS.

However, this proposal disadvantageously requires an additional procedure in which the RS requests from the BS CID assignment and receives the assigned CID, thereby causing a time delay. Moreover, the time delay increases as the number of hops between the BS and the MS increases (in FIG. 3, a two-hop relay path is shown)

Therefore, there is a need for an apparatus and method for rapidly processing a ranging request of an MS communicating with an RS.

SUMMARY OF THE INVENTION

An aspect of the present invention is to substantially solve at least the above problems and/or disadvantages and to provide at least the advantages below. Accordingly, an aspect of the present invention is to provide an apparatus and method for rapidly processing an RNG-REQ message transmitted from an MS to an RS in a multi-hop relay BWA system.

Another aspect of the present invention is to provide an apparatus method for an RS to manage a plurality of CIDs assigned from a BS in a multi-hop relay BWA system.

A further aspect of the present invention is to provide an apparatus and method for assigning a CID to an MS accessing an RS in a multi-hop relay BWA system.

According to one aspect of the present invention, there is provided an apparatus for a Relay Station (RS) in a multi-hop relay cellular communication system, the apparatus including a database for managing a Connection Identifier (CID) set assigned to the RS by a Base Station (BS); a controller for accessing the database to assign one CID of the CID set to a Mobile Station (MS) when receiving a predetermined control message from the MS; and a transmitter constructing a response message including the CID assigned to the MS and transmitting the response message to the MS.

According to another aspect of the present invention, there is provided an apparatus for managing CIDs in a multi-hop relay cellular communication system, the apparatus including an RS; a BS for assigning a CID set to the RS when the RS accesses the BS; and an MS for transmitting an RNG-REQ message to the RS and receiving a ranging response (RNG-RSP) message from the RS, wherein the RS manages the CID set assigned by the BS, assigns the MS at least one CID of the CID set when receiving the RNG-REQ message from the MS, and transmits the RNG-RSP message to the MS, the RNG-RSP message including the CID assigned to the MS.

According to a further aspect of the present invention, there is provided a communication method for an RS in a multi-hop relay cellular communication system, the communication method including recording a CID set assigned by a BS in a database; when receiving a predetermined control message from an MS, accessing the database to assign one CID of the CID set to the MS; and constructing a response message including the CID assigned to the MS so as to transmit the response message to the MS.

According to a still another aspect of the present invention, there is provided a method for managing CIDs in a multi-hop relay cellular communication system, the method including operating a BS to assign a CID set to an RS accessing the BS; operating an MS to transmit an RNG-REQ message to the RS; and operating the RS to manage the CID set assigned by the BS, assign the MS at least one CID of the CID set when the RS receives the RNG-REQ message from the MS, and transmit an RNG-RSP message to the MS, the RNG-RSP message including the CID assigned to the MS.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail. Also, the terms used herein are defined according to the functions of the present invention. Thus, the terms may vary depending on user's or operator's intension and usage. That is, the terms used herein must be understood based on the descriptions made herein.

Hereinafter, an apparatus and method for an RS to assign a CID to an MS in a multi-hop relay BWA system will be described in detail.

The multi-hop relay BWA system uses an OFDM scheme or an OFDMA scheme, for example. The multi-hop relay BWA system can transmit physical channel signals using a plurality of subcarriers, thereby enabling high-rate data transmission. The multi-hop relay BWA system supports a multi-cell structure, thereby supporting the mobility of an MS.

In the following description, a multi-hop relay BWA system is used for explaining the present invention. However, the present invention can be applied to any cellular communication system using a multi-hop relay scheme.

Figure 1:
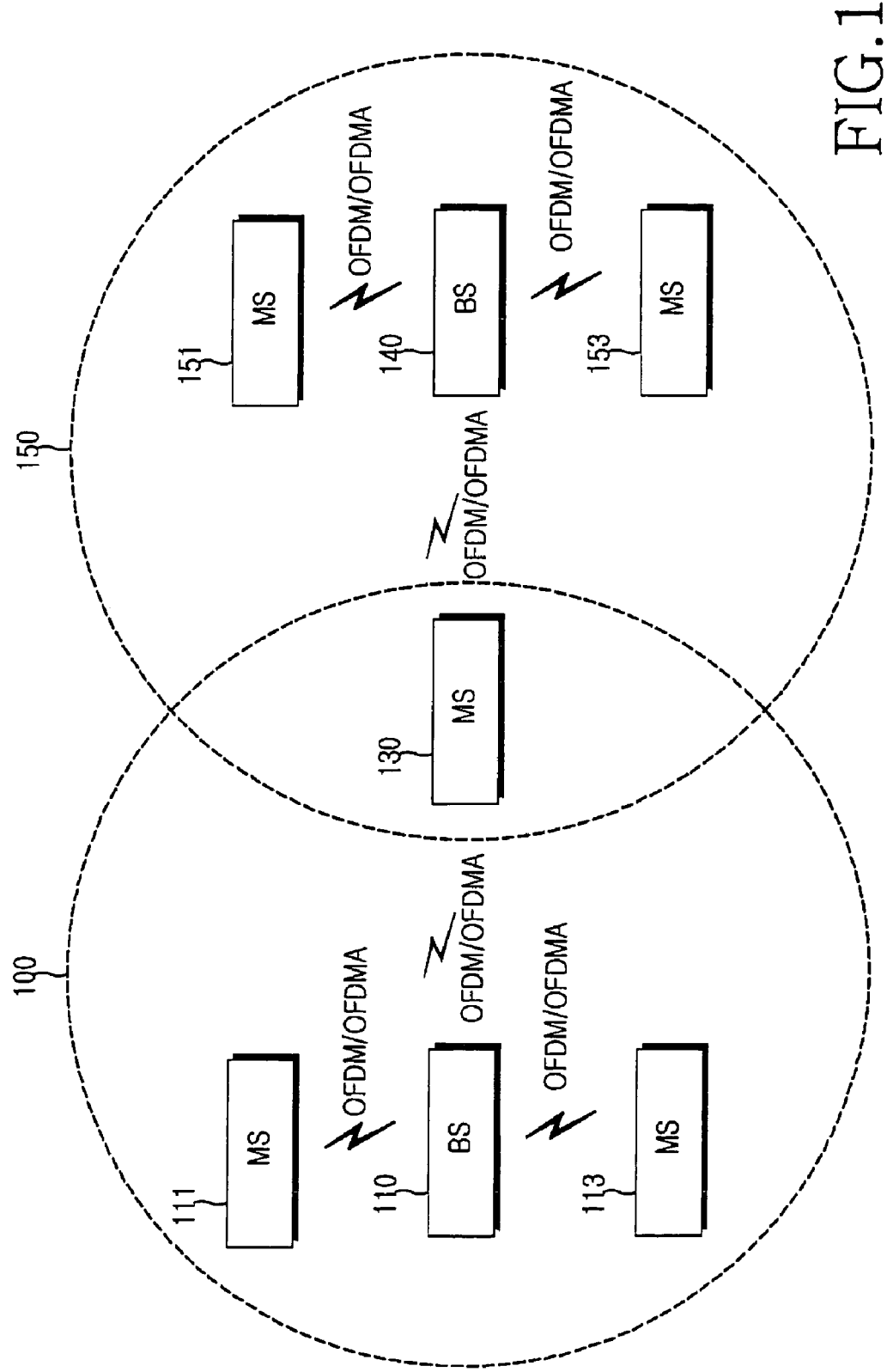
FIG. 1 is a block diagram of a conventional Broadband Wireless Access (BWA) system.
Figure 2:
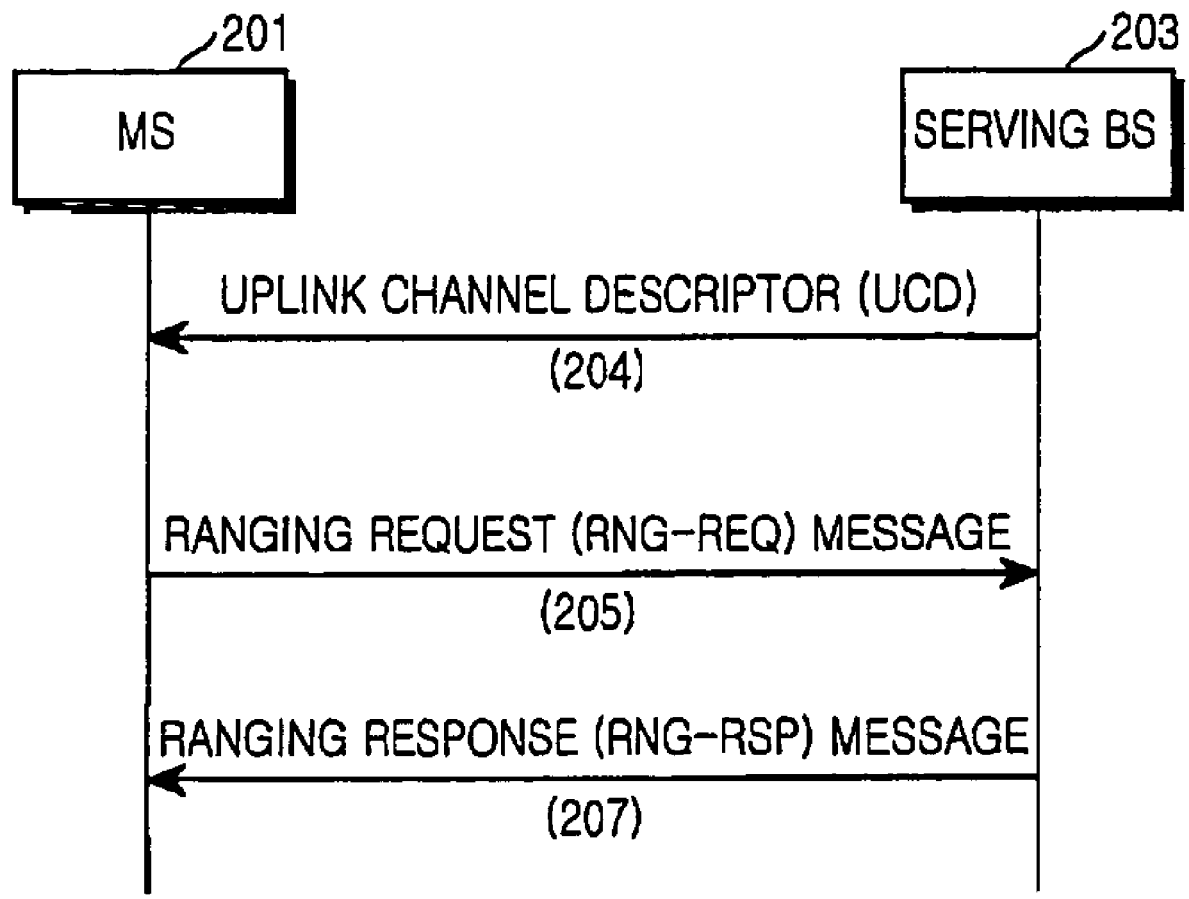
FIG. 2 is a diagram for explaining an initial ranging process in a conventional BWA system.
Figure 3:
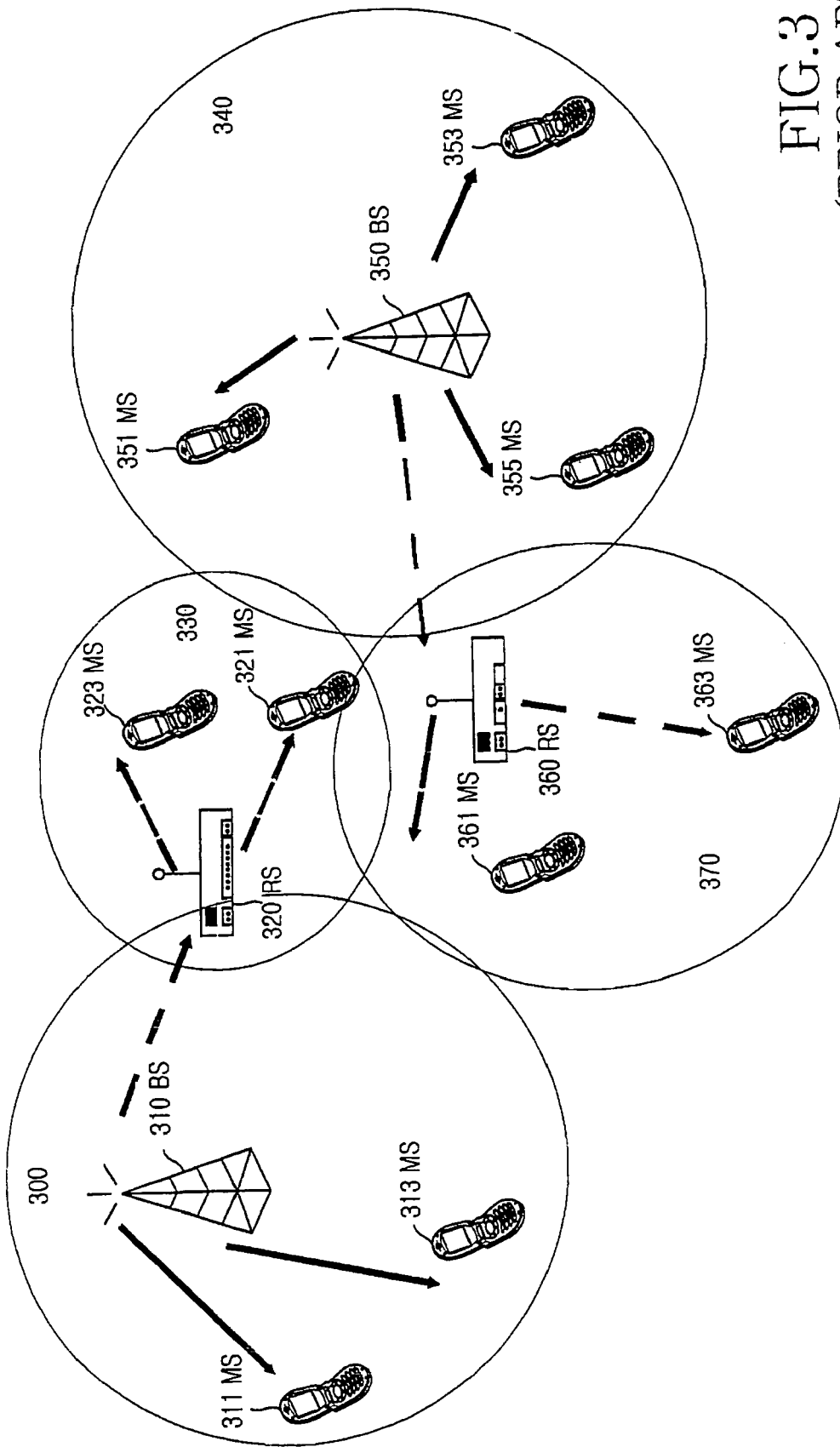
FIG. 3 is a diagram illustrating a BWA system using a multi-hop relay scheme to expand a BS service coverage area.
Figure 4:
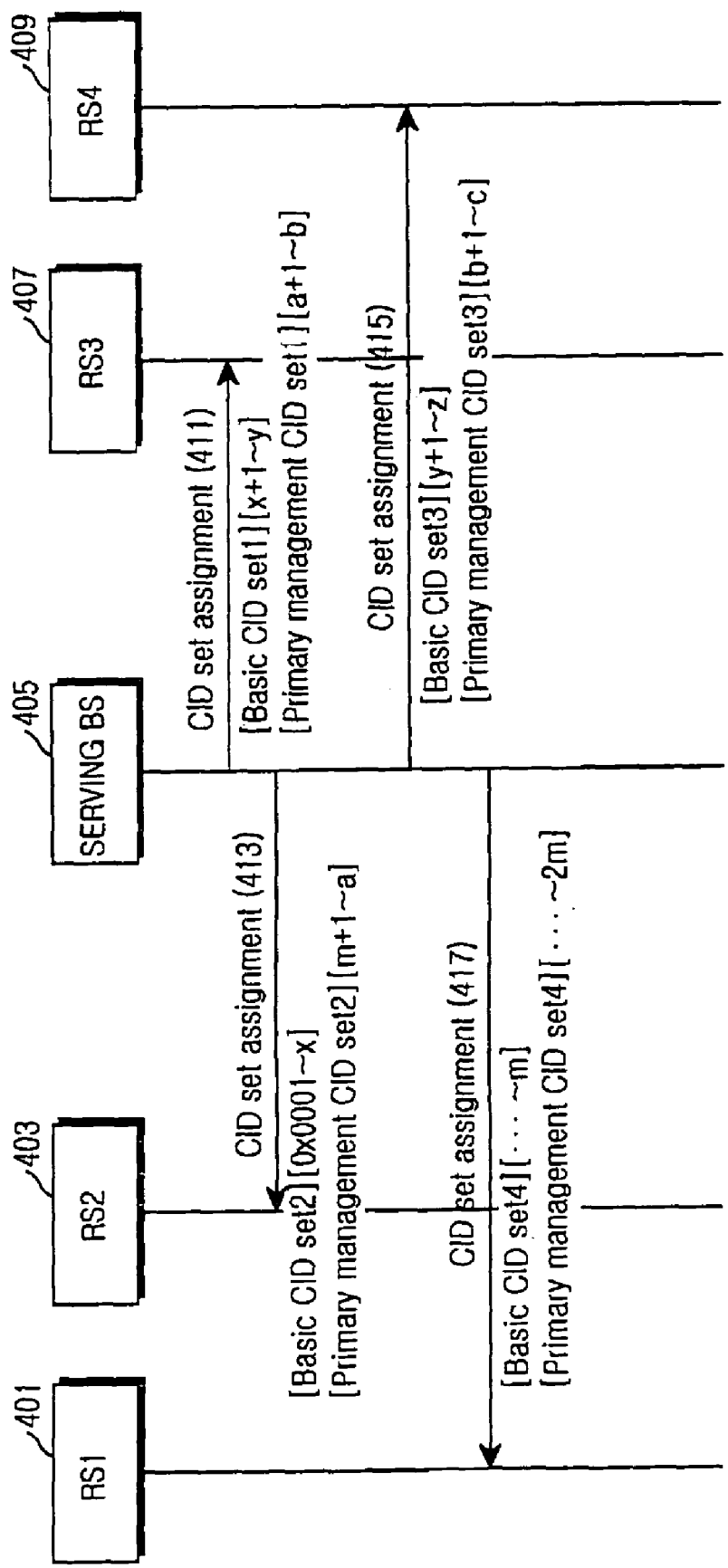
FIG. 4 is a diagram for explaining an assignment process of Connection Identifier (CID) sets to Relay Stations (RSs) in a multi-hop relay BWA system according to the present invention.

FIG. 4 is a diagram for explaining an assignment process of CID sets to RSs in a multi-hop relay BWA system according to the present invention. A serving BS 405 manages a first RS 401, a second RS 403, a third RS 407, and a fourth RS 409.

Referring to FIG. 4, in step 411, the serving BS 405 assigns the third RS 407 a predetermined CID set. For example, the CID set can be assigned when the third RS 407 initially accesses the serving BS 405. Alternatively, the CID set can be assigned in a separate signaling procedure after the third RS 407 registers with the serving BS 405. In the step 411, the serving BS 405 assigns the third RS 407 the CID set that will be managed by the third RS 407, and the CID set includes a Basic CID set1 and a Primary management CID set1.

As shown in FIG. 4, the Basic CID set1 assigned to the third RS 407 includes a plurality of CIDs ranging from x+1 to y, and the Primary management CID set1 includes a plurality of CIDs ranging from a+1 to b. Each of the Basic CID set1 and the Primary management CID set1 includes successive CIDs. The Basic CID set1 and the Primary management CID set1 can include non-successive CIDs.

In step 413, the serving BS 405 assigns the second RS 403 a Basic CID set2 and a Primary management CID set2. In step 415, the serving BS 405 assigns the fourth RS 409 a Basic CID set3 and a Primary management CID set3.

In step 417, the serving BS 405 assigns the first RS 401 a Basic CID set4 and a Primary management CID set4.

The RSs 401, 403, 407, and 409 may be infrastructure RSs that are installed by a service provider and are managed by the BS 405 knowing the existence of the RSs 401, 403, 407, and 409. The RSs 401, 403, 407, and 409 can be client RSs that operate as subscriber terminals (SSs or MSs) or RSs according to environments. The RSs 401, 403, 407, and 409 may be fixed RSs, nomadic RSs having nomadic characteristics such as notebook computers, or mobile RSs having mobility such as MSs.

After all the RSs 401, 403, 407, 409 are assigned the CID sets, the serving BS 405 records information about the CID set assignment into a CID assignment table (database).

Table 4 below shows an example of the CID assignment table of the BS 405.

TABLE 4

| Basic CID set | RS | Primary management CID set | RS |
|---|---|---|---|
| 0x0001~x | RS2 | m + 1~a | RS2 |
| x + 1~y | RS3 | a + 1~b | RS3 |
| y + 1~z | RS4 | b + 1~c | RS4 |
| . . . | not assigned | . . . | not assigned |
| ~m | RS1 | ~2m | RS1 |

The serving BS 405 can effectively manage the Basic CID sets and the Primary management CID sets assigned to the RSs 401, 403, 407, and 409 by using the CID assignment table.

Each of the RSs 401, 403, 407, and 409 re-assigns the CID set to an MS that requests ranging.

Figure 5:
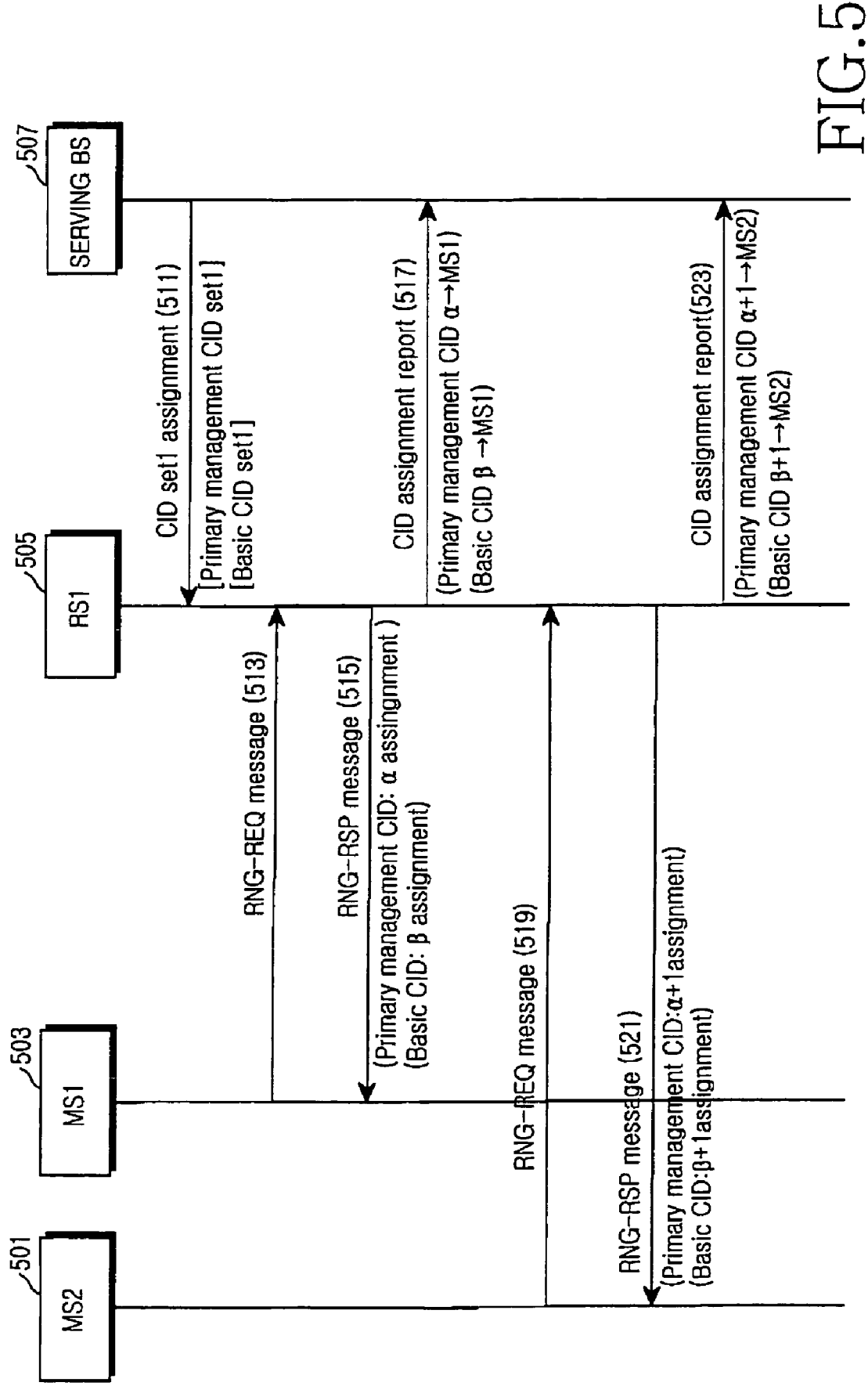
FIG. 5 is a diagram for explaining a CID assignment process in which a Base Station (BS) assigns an RS a CID set and the RS assigns CIDs respectively to Mobile Stations (MSs) in a multi-hop relay BWA system according to the present invention.

FIG. 5 is a diagram for explaining a CID assignment process in which an RS assigns CIDs to MSs in a multi-hop relay BWA system according to the present invention. An RS receives RNG-REQ messages from two MSs.

Referring to FIG. 5, in step 511, a serving BS 507 assigns an RS 505 a CID set1. For example, the CID set1 may include a Basic CID set1 used for transmitting control signals and a Primary management CID set1 used for a network entry procedure.

In step 513, the RS 505 receives an RNG-REQ message from a first MS 503. In step 515, the RS 505 assigns the first MS 503 one CID of the CID set1 previously received from the serving BS 507, constructs an RNG-RSP message including the CID assigned to the first MS 503, and sends the RNG-RSP message to the first MS 503. The CID assigned to the first MS 503 is used before actual data transmission and may include a Primary management CID and a Basic CID. In step 517, the RS 505 informs the serving BS 507 of the CID assigned to the first MS 503. Then, the serving BS 507 manages CIDs assigned to each MS using a CID assignment table such as shown in Table 5 below.

In step 519, the RS 505 receives an RNG-REQ message from a second MS 501. In step 521, the RS 505 assigns the second MS 501 one CID of the CID set1 previously received from the serving BS 507, constructs an RNG-RSP message including the CID assigned to the second MS 501, and sends the RNG-RSP message to the second MS 501. The CID assigned to the second MS 501 is used before actual data transmission and may include a Primary management CID and a Basic CID. In step 523, the RS 505 informs the serving BS 507 of the CID assigned to the second MS 501. Then, the serving BS 507 manages CIDs assigned to each MS using the CID assignment table such as shown in Table 5 below.

617, the RS may reject the RNG-REQ of the MS or request the serving BS to send a CID set.

If the CID table contains a CID that can be assigned to the MS; the RS goes to step 609 where the RS assigns the CID (including a Primary management CID and a Basic CID) to the MS and updates the CID table using the CID assigned to the MS and the MAC address of the MS.

In step 611, the RS processes the RNG-REQ message of the MS except for the MAC address field that is already processed. In step 613, the RS generates an RNG-RSP message using the results obtained from the processing of the RNG-REQ message. The RNG-RSP message includes the Primary management CID and the Basic CID that are assigned to the MS. In step 615, the RS transmit the RNG-RSP message to the MS.

TABLE 5

| Basic CID set | RS | Primary management CID set | | RS | | |
|---|---|---|---|---|---|---|
| 0x0001~x | RS2 | 0x0001<br>0x0002<br>...<br>x | MS5<br>...<br>...<br>... | m + 1~a | RS2 | m + 1<br>m + 2<br>...<br>a | MS5<br>...<br>...<br>... |
| x + 1~y | RS3 | x + 1<br>x + 2<br>...<br>y | | a + 1~b | RS3 | | |
| y + 1~z | RS4 | y + 1<br>y + 2<br>...<br>z | | b + 1~c | RS4 | | |
| ... | not assigned | | | ... | not assigned | | |
| ~m | RS1 | | | ~2m | RS1 | | |

The serving BS 507 preassigns the RS 505 a plurality of CIDs. Therefore, when an RNG-REQ message is received from the MS 501 or 503, the RS 505 can assign the MS 501 or 503 one of the CIDs. That is, an MS can be assigned a CID directly by an RS.

The steps 517 and 523 in which the RS 505 informs the serving BS 409 of the CIDs assigned to the first and the second MSs 501 and 503 can be omitted. In this case, when the BS 507 receives a message from the first MS 503 (or the second MS 501), the BS 507 can determine that which CID is assigned to the first MS 503 since the message includes the CID assigned to the first MS 503. Therefore, although the RS 505 does not inform the BS 507 of the CIDs assigned to the MSs 501 and 503, the BS 507 can construct the CID assignment table such as Table 5 using messages from the MSs 501 and 503.

Figure 6:
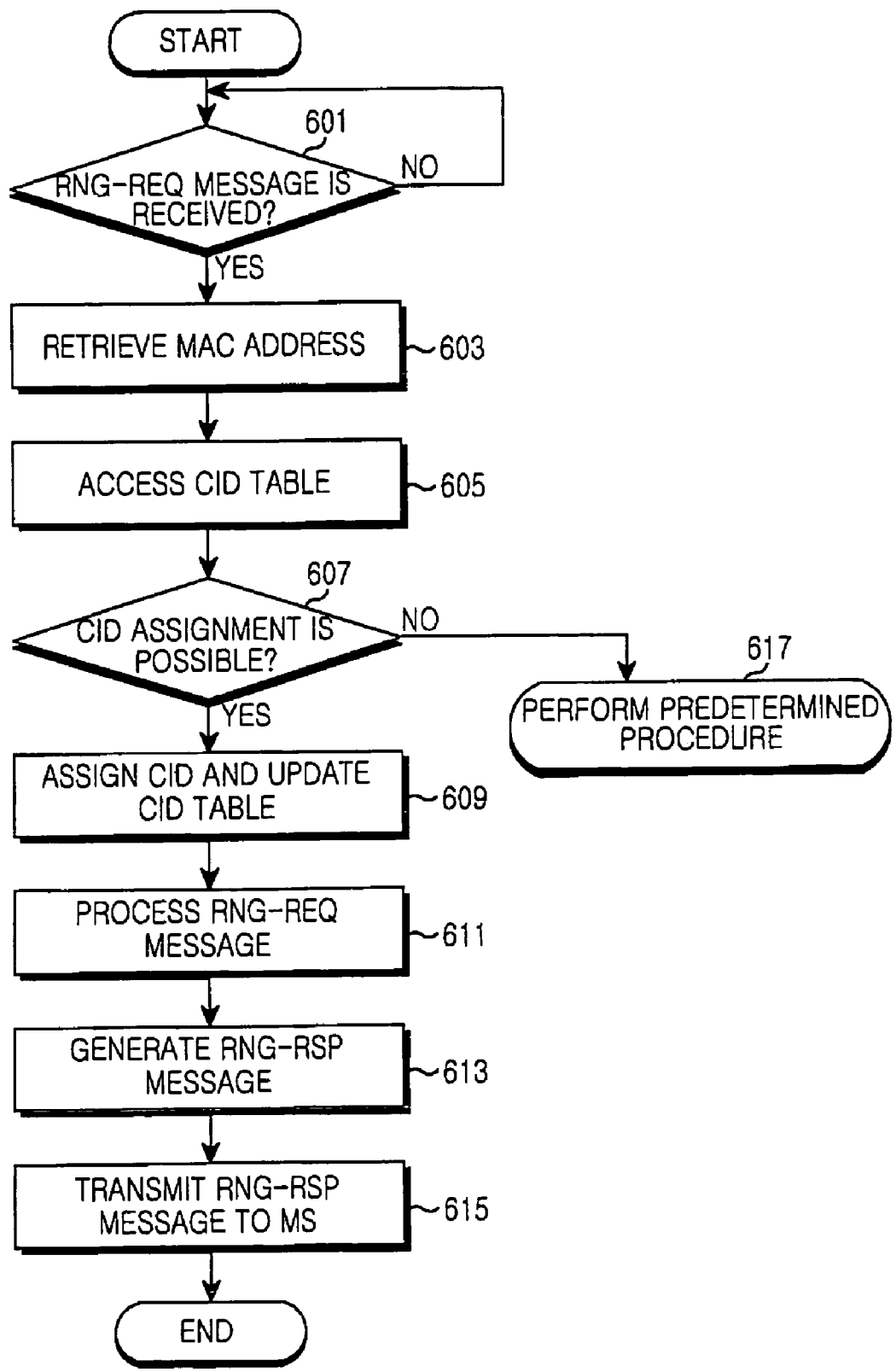
FIG. 6 is a flowchart for explaining a communication process of an RS in a multi-hop relay BWA system according to the present invention.

FIG. 6 is a flowchart for explaining a communication process of an RS in a multi-hop relay BWA system according to the present invention. FIG. 6 describes a communication process of an RS after the RS is assigned a CID set from a BS through an initial access procedure or an additional signaling procedure.

Referring to FIG. 6, in step 601, an RS determines if an RNG-REQ message is received from an MS. If so, the RS retrieve a MAC address of the MS from the RNG-REQ message in step 603.

Figure 7:
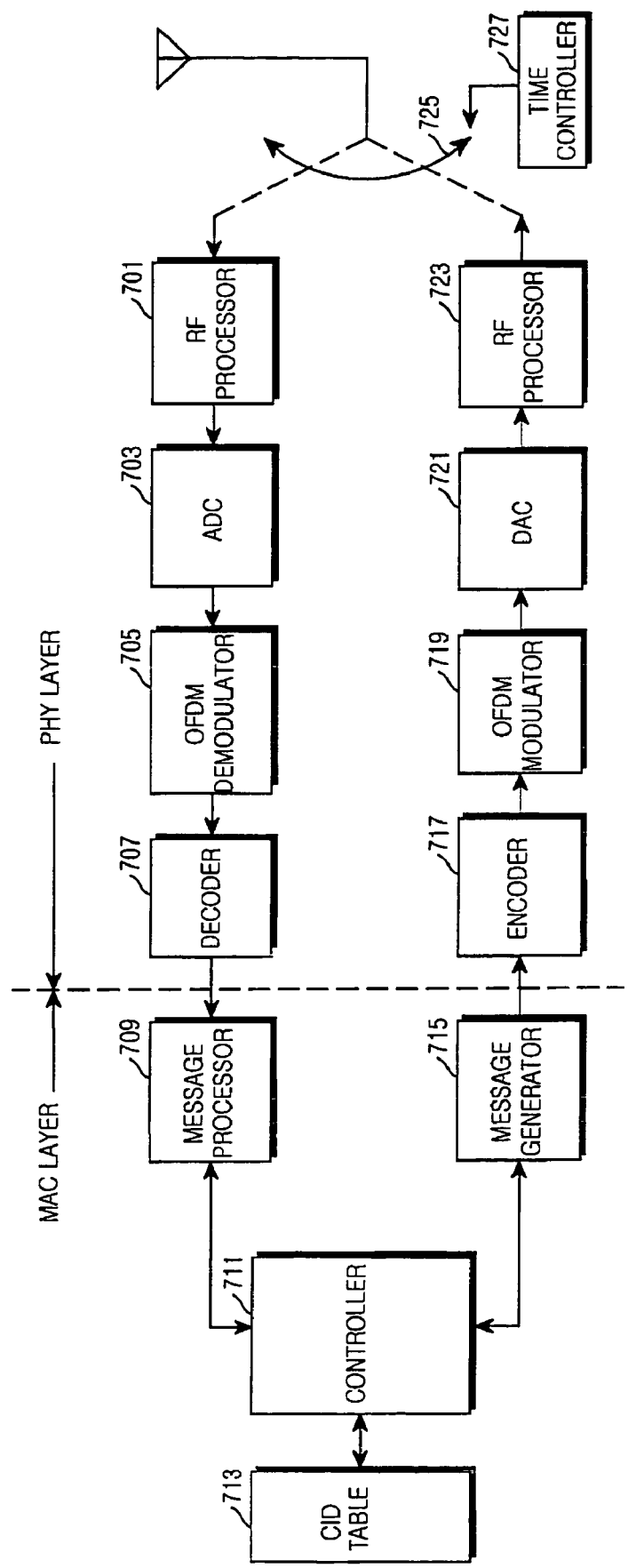
FIG. 7 is a block diagram illustrating a structure of an RS in a multi-hop relay BWA system according to the present invention.

In step 605, the RS accesses a CID table where CIDs assigned by a serving BS are stored. In step 607, the RS determines if the CID table contains a CID that can be assigned to the MS. If not, the RS goes to step 617 where the RS performs a predetermined procedure. For example, in step FIG. 7 is a block diagram illustrating a structure of an RS in a multi-hop relay BWA system according to the present invention. An RS using a Time Division Duplex (TDD)-OFDMA scheme is described, concentrating on the control message processing of the RS.

Referring to FIG. 7, the RS includes a radio frequency (RF) processor 701, an analog-to-digital converter (ADC) 703, an OFDM demodulator 705, a decoder 707, a message processor 709, a controller 711, a CID table 713, a message generator 715, an encoder 717, an OFDM modulator 719, a digital-to-analog converter (DAC) 721, an RF processor 723, a switch 725, and a time controller 727.

The time controller 727 controls a switching operation of the switch 725 based on frame synchronization. For example, when in an RX section of a frame, the time controller 727 controls the switch 725 so that an antenna is connected to the RF processor 701 to receive a signal from an MS or a BS. When in a TX section of the frame, the time controller 727 controls the switch 725 so that the antenna is connected to the RF processor 723 to transmit a signal to the MS or the RS.

In the RX section of the frame, the RF processor 701 converts an RF signal received through the antenna into a baseband analog signal. The ADC 703 samples the analog signal received from the RF processor 701 so as to convert the analog signal into a sampled data (digital signal). The OFDM demodulator 705 performs Fast Fourier Transform (FFT) on the sampled data to output frequency-domain data.

The decoder 707 selects data of desired subcarriers from the frequency-domain data. Then, the decoder 707 demodulates and decodes the selected data depending on a predetermined modulation and coding scheme (MCS) level.

The message processor 709 processes a control message from the decoder 707 and sends the results of the processing to the controller 711. When the RS receives an RNG-REQ message, the message processor 709 extracts various information from the RNG-REQ message and provides the extracted information to the controller 711.

The controller 711 performs processing according to the information received from the message processor 709 and provides the results of the processing to the message generator 715. The CID table 713 is a database for managing CIDs assigned from a serving BS. For example, the CID table 713 stores a Primary management CID set and a Basic CID set that are assigned from a serving BS.

When an RNG-REQ message is received from an MS, the controller 711 accesses the CID table 713 to determine whether an available CID is in the CID table 713. If so, the controller 711 update the CID table 713 by mapping a MAC address of the MS included in the RNG-REG message into the available CID. The controller 711 informs the message generator 715 of the CID assigned to the MS.

The message generator 715 generates a message using information received from the controller 711 and provides the message to the encoder 717. The message generator 715 generates an RNG-RSP message including the received information regarding the CID assigned to the MS and sends the RNG-RSP message to the encoder 717.

The encoder 717 encodes and modulates the RNG-RSP message received from the message generator 715 according to a predetermined MCS level. The OFDM modulator 719 processes the data (RNG-RSP message) received from the encoder 717 by Inverse Fast Fourier Transform (IFFT), obtaining sampled data (OFDM symbols). The DAC 721 converts the sampled data into an analog signal. The RF processor 723 converts the analog signal received from the DAC convert 721 into an RF signal and transmits the RF signal through the antenna.

In the configuration of the RS shown in FIG. 7, the controller 711 controls the message processor 709, the message generator 715, and use of the CID table 713, as a protocol controller. The controller 711 can perform the functions of the message processor 709, the message generator 715, and the CID table 713. Although separate units are provided for respective functions of the controller 711 in the present embodiment, the controller 711 can perform all or some of the functions instead of such separate units.

A CID is assigned to an MS during an initial ranging procedure. However, if necessary, the CID assignment can be applied to other signaling procedure. Although a Primary management CID and a Basic CID are assigned to an MS in the current embodiment, other CIDs can be assigned to the MS in the same way.

As described above, in a multi-hop relay BWA system, a serving BS assigns an RS a CID set, and the RS manages the assigned CID set. When the RS receives an RNG-REQ message from an MS, the RS can assign the MS a CID (one of the CID set previously received from the BS) without communication with the serving BS. Unnecessary communication between the serving BS and the RS can be removed in an initial ranging procedure, thereby providing fast initial ranging and saving wireless resources between the serving BS and the RS. Furthermore, even when the RS does not inform the serving BS of the CID assigned to the MS, the serving BS can get information-about the CID assignment since a message transmitted by the MS includes the CID assigned to the MS.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A communication method for an upper node in a communication system, the communication method comprising:
   assigning a Connection IDentifier (CID) set to a Relay Station (RS) in a CID assignment message, wherein the CID set comprises a plurality of unassigned CIDs;
   transmitting the CID assignment message to the RS;
   receiving a message for reporting at least one CID assigned by the RS to a lower node of the RS, from the RS; and
   updating a database for managing CID use based on the message for reporting from the RS;
   wherein the CID is used for managing the connection between the upper node and the lower node; and
   wherein the CID set includes successive CIDs.

2. The communication method of claim 1, wherein the CID assignment message includes information on first and last CIDs of the successive CIDs.

3. The communication method of claim 1, wherein the upper node includes a Base Station (BS) or an upper RS.

4. The communication method of claim 1, wherein the lower node includes a Mobile Station (MS) or a lower RS.

5. The communication method of claim 1, wherein the CID set assigned to the RS includes at least one of a primary management CID and a basic CID.

6. The communication method of claim 1, wherein the CID set is assigned to the RS by the upper node in a separate signaling procedure after the RS registers with the upper node.

7. The communication method of claim 1, wherein the communication system is an OFDM system.

8. A communication method for a Relay Station (RS) in a communication system, the communication method comprising:
   receiving a Connection IDentifier (CID) assignment message including information on a CID set from an upper node, wherein the CID set comprises a plurality of unassigned CIDs;
   configuring a database for managing the CID set according to the CID assignment message;
   receiving a ranging request (RNG-REQ) message from a lower node;
   assigning at least one CID from the CID set to the lower node;
   transmitting a ranging response (RSG-RSP) message including the at least one CID assigned to the lower node; and
   transmitting a message for reporting the at least one CID assigned by the RS to the lower node, to the upper node;
   wherein the CID is used for managing the connection between the upper node and the lower node; and
   wherein the CID set includes successive CIDs.

9. The communication method of claim 8, wherein the CID assignment message includes information on first and last CIDs of the successive CIDs.

10. The communication method of claim 8, wherein the upper node includes a Base Station (BS) or an upper RS.

11. The communication method of claim 8, wherein the lower node includes a Mobile Station (MS) or a lower RS.

12. The communication method of claim 8, wherein the CID assigned to the lower node includes at least one of a primary management CID and a basic CID.

13. The communication method of claim 8, wherein the CID set is assigned to the RS by the upper node in a separate signaling procedure after the RS registers with the upper node.

14. The communication method of claim 8, wherein the communication system is an OFDM system.

15. An upper node in a communication system, comprising:
- a controller for assigning a Connection IDentifier (CID) set to a Relay Station (RS) in a CID assignment message, wherein the CID set comprises a plurality of unassigned CIDs;
- a transmitter for transmitting the CID assignment message to the RS;
- a receiver for receiving a message for reporting at least one CID of the CID set was assigned by the RS to a lower node of the RS; and
- a database for managing CID use based on the message for reporting from the RS;
- wherein the CID is used for managing the connection between the upper node and the lower node; and
- wherein the CID set comprises successive CIDs.

16. The upper node of claim 15, the CID assignment message comprises information on first and last CIDs of the successive CIDs.

17. The upper node of claim 15, wherein the upper node includes a Base Station (BS) or an upper RS.

18. The upper node of claim 15, wherein the lower node includes a Mobile Station (MS) or a lower RS.

19. The upper node of claim 15, wherein the CID set assigned to the RS includes at least one of a primary management CID and a basic CID.

20. The upper node of claim 15, wherein the CID set is assigned to the RS by the upper node in a separate signaling procedure after the RS registers with the upper node.

21. The upper node of claim 15, wherein the communication system is an OFDM system.

22. A Relay Station (RS) in a communication system, comprising:
- a receiver for receiving a Connection IDentifier (CID) assignment message including information on a CID set from an upper node, wherein the CID set comprises a plurality of unassigned CIDs;
- a controller for configuring a database for managing the CID set according to the CID assignment message; and
- a transmitter;
- wherein the receiver receives a ranging request (RNG-REQ) message from a lower node, the controller assigns at least one CID from the CID set to the lower node, and the transmitter transmits a ranging response (RSG-RSP) message including the at least one CID assigned to the lower node and transmits a message for reporting the at least one CID of the CID set assigned by the RS to the lower node, to the upper node;
- wherein the CID is used for managing the connection between the upper node and the lower node; and
- wherein the CID set comprises successive CIDs.

23. The RS of claim 22, wherein the CID assignment message includes information on first and last CIDs of the successive CIDs.

24. The RS of claim 22, wherein the lower node comprises a Mobile Station (MS) or a lower RS.

25. The RS of claim 22, wherein the upper node includes a Base Station (BS) or an upper RS.

26. The RS of claim 22, wherein the CID assigned to the lower node includes at least one of a primary management CID and a basic CID.

27. The RS of claim 22, wherein the CID set is assigned to the RS by the upper node in a separate signaling procedure after the RS registers with the upper node.

28. The RS of claim 22, wherein the communication system is an OFDM system.

* * * * *